Patented Aug. 29, 1939

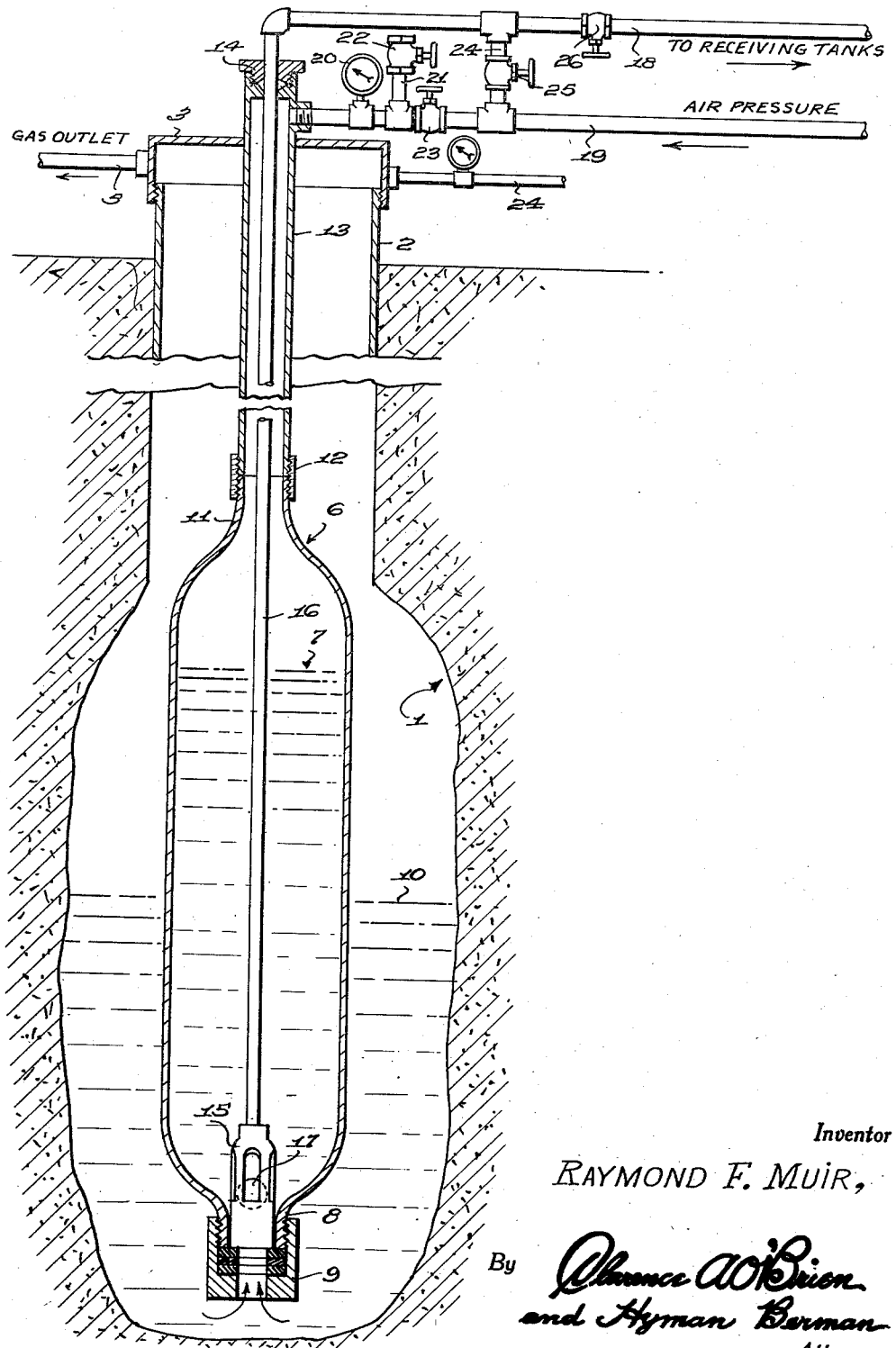

2,171,402

UNITED STATES PATENT OFFICE 2,171,402

FLUID WELL FLOWING MEANS

Raymond F. Muir, Grand Valley, Pa., assignor of one-half to Wallace P. Strait, Grand Valley, Pa.

Application September 19, 1938, Serial No. 230,713

3 Claims. (Cl. 103—234)

My invention appertains to oil and water well constructions in general, and the principal object is to provide an improved structure remarkably simple and economical in character and susceptible of adequately flowing the fluid under hand and pressure regulated conditions at predetermined intervals depending on the natural supply of fluid in the hole.

In keeping with underlying principles of reliable fluid control, the preferred embodiment is characterized by a valved reservoir functioning as a trap, a conduit being connected thereto to feed air, under pressure, whereby to lift the fluid column, at desired intervals, through a pipeline leading to the receiving and storage tanks.

A further advantage is derived from the adoption and use of interconnected piping having a valved by-pass incorporated therein, whereby to utilize the hand regulated air pressure to blow clean the ball check valve and its encompassing cage.

Other features and advantages may perhaps become equally well apparent from the succeeding description and accompanying terminal claims.

In the illustrative drawing, wherein like reference numerals designate corresponding parts throughout the single view:

The figure structurally represents the preferred embodiment of the invention as organized and particularly perfected under the principles of this invention.

Merely as a matter of convenience of description, it is to be assumed that we are concerned with an oil well. Therefore, the excavation or hole 1 has leading thereinto to the desired depth an appropriate well casing 2. Above the surface and attached to the upper portion of the well casing is a suitable casing head 3 having a pressure gage line 4 on one side and a gas vent pipe 5 on the opposite side.

The flow device is characterized essentially by an appropriately proportioned enclosure 6 forming the reservoir. This is of cylindrical cross sectional form, in the main, and functions as a trap for the oil 7 to be lifted and withdrawn. The reduced lower end 8 is provided with a packed fitting or collar 9, this being properly ported to allow the incoming oil 10 to enter the trap. The upper reduced neck portion 11 is joined by an appropriate coupling 12 to the barrel 13 leading up through and beyond the casing head and terminating in a suitable stuffing box 14.

The standing valve comprises an appropriate cage 15 on the lower end of the oil flow lifting pipe 16. As is customary the cage houses a ball check valve 17. The flow pipe 16 leads up through and beyond the stuffing box where it is in communication with the discharge pipe 18, this leading to the receiving and storage tanks (not shown).

Parallel to the pipe 18 is the air pressure supply line or pipe 19, this being connected to the upper end portion of the barrel 13 to feed the air, under pressure, into the reservoir or trap 6. Adjacent to the barrel and in the line 19 is a suitable pressure detector gage 20. Annexed in the line 19 is a bleed pipe 21 having a relief cock 22. Near this is a cutoff valve or cock 23. The cross-pipe 24 is a by-pass and also provided with a hand regulated cock 25. This valved by-pass joins the lines 18 and 19. The remaining cutoff cock 26 is in the line 18.

The ball valve at the bottom of the trap will admit fluid from the hole whenever air pressure in the trap or reservoir is normal. Closing the air pressure valve 23 and opening the bleeder valve 22 insures this. When the trap chamber or reservoir 6 has thus filled to the level of the fluid 10 outside, this condition is indicated by the cessation of air flow through the bleeder valve. Then the system is ready to initiate the exit flow.

The flow is accomplished by closing the bleeder valve 22 and opening the pressure regulating or cutoff valve 23 to the proper pressure as indicated by the height to which the fluid is to be lifted. Air pressure entering the tubing exerts pressure on the top of the column of fluid 7 trapped in the chamber and in so doing closes the ball check valve. Hence the fluid 7 enters through the apertured cage 15 and is forced up through the flow pipe 16 and on out through the line 18 to the tank. It continues until all of the fluid has been exhausted from the trapping chamber. Then the closing of the pressure valve and the reopening of the bleeder valve permits more fluid to flow into the trapping chamber, when it is again set for the next operation.

By closing the valve 23, the valve 26 and opening the valve 25, the air can be shot down through the pipe-end 18 and through the pipeline 16 to clear the ball check valve of obstruction and to wash away the sand and small accumulation, etc.

It is thought that persons skilled in the art to which the invention relates will be able to obtain a clear understanding of the invention after considering the description in connection with the drawing. Therefore, a more lengthy description is regarded as unnecessary.

Minor changes in shape, size, and rearrangement of details coming within the field of invention claimed may be resorted to in actual practice, if desired.

What I claim is:

1. In a structural assemblage of the class described, in combination, a well casing, a casing head having gaging and venting means, a barrel mounted in said casing head and provided with a stuffing box, a trapping and oil containing reservoir connected to the lower end of said barrel, an apertured intake fitting on the lower end of said reservoir, a valve cage in the lower end of the reservoir, a ball check valve therein, a flow discharge and lifting pipe connected to the cage and extending up through the reservoir and barrel and stuffing box, a discharge line connected with said flow pipe and provided with a hand controlled cock, a valved air pressure pipe connected with the upper end portion of said barrel to feed air under pressure down into the reservoir, a valved bleed pipe connected with said air pressure pipe, and a valved by-pass joining said air pressure pipe and discharge line together.

2. In a structural assemblage of the class described, in combination, a well casing, a barrel supported from and depending into said casing, a trapping and oil containing reservoir connected to the lower end of said barrel, a check valve mounted in the intake end of said reservoir, a flow discharge and lifting pipe connected to the valved intake of the reservoir and extending up through the same and projecting outwardly beyond the well casing, a discharge line connected with said flow pipe and provided with a hand controlled cock, a valved air pressure pipe connected with the upper end portion of said barrel to feed air under pressure down into the reservoir, a valved bleed pipe connected with said air pressure pipe, and a valved by-pass joining said air pressure pipe and discharge line together.

3. In a structural assemblage of the class described, in combination, a well casing, a barrel supported from and depending into said casing, a trapping and oil containing reservoir connected to the lower end of said barrel, a check valve mounted in the intake end of said reservoir, a flow discharge and lifting pipe connected to the valved intake of the reservoir and extending up through the same and projecting outwardly beyond the well casing, a discharge line connected to said flow pipe and provided with a hand controlled cock, a valved air pressure pipe connected with the upper end portion of said barrel to feed air under pressure down into the reservoir and a valved bleed pipe connected with said air pressure pipe.

RAYMOND F. MUIR.